United States Patent
Shen et al.

(10) Patent No.: US 11,829,032 B2
(45) Date of Patent: *Nov. 28, 2023

(54) BACKLIGHT MODULE INCLUDING FIXING MEMBER, DISPLAY MODULE AND ASSEMBLING METHOD THEREOF

(71) Applicants: K-TRONICS (SUZHOU) TECHNOLOGY CO., LTD., Jiangsu (CN); BOE TECHNOLOGY GROUP CO., LTD., Beijing (CN)

(72) Inventors: Yunben Shen, Beijing (CN); Lihua Sheng, Beijing (CN); Zhou Lu, Beijing (CN); Feng Zhou, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,018

(22) Filed: Aug. 8, 2022

(65) Prior Publication Data

US 2022/0381971 A1 Dec. 1, 2022

Related U.S. Application Data

(63) Continuation-in-part of application No. 17/265,913, filed as application No. PCT/CN2020/105147 on Jul. 28, 2020, now Pat. No. 11,442,307.

(30) Foreign Application Priority Data

Oct. 31, 2019 (CN) .......................... 201911056111.3

(51) Int. Cl.
*G02F 1/13357* (2006.01)
*F21V 8/00* (2006.01)
*G02F 1/1333* (2006.01)

(52) U.S. Cl.
CPC ..... *G02F 1/133608* (2013.01); *G02B 6/0031* (2013.01); *G02B 6/0068* (2013.01);
(Continued)

(58) Field of Classification Search
CPC ..................... G02F 1/133314; G02F 1/133608
See application file for complete search history.

(56) References Cited

U.S. PATENT DOCUMENTS 11,150,500 B2 * 10/2021 Shen ................. G02F 1/133308
11,442,307 B2 * 9/2022 Shen ................. G02F 1/133314
(Continued)

FOREIGN PATENT DOCUMENTS

CN 101464570 A 6/2009
CN 201368950 Y 12/2009
(Continued)

OTHER PUBLICATIONS

PCT/CN2020105147 International Search Report and Written Opinion, dated Dec. 10, 2020, English Translation.
(Continued)

*Primary Examiner* — Keith G. Delahoussaye
(74) *Attorney, Agent, or Firm* — DINSMORE & SHOHL LLP (57) ABSTRACT

The present disclosure relates to a backlight module, a display module and an assembling method thereof. The backlight module includes: a backplane; a fixing member fixedly connected to the backplane; and an insertion clamp including a mounting portion fixedly connected to the fixing member, and a clamping portion for clamping to a circuit board inserted between the fixing member and the insertion clamp.

19 Claims, 8 Drawing Sheets

(52) U.S. Cl.
CPC ..... *G02B 6/0088* (2013.01); *G02F 1/133314* (2021.01); *G02F 1/133603* (2013.01); *G02F 2201/46* (2013.01); *G02F 2201/465* (2013.01)

(56) References Cited

U.S. PATENT DOCUMENTS

| | | | |
|---|---|---|---|
| 2003/0063230 | A1 | 4/2003 | Kato et al. |
| 2012/0057093 | A1 | 3/2012 | Zhang |
| 2012/0229733 | A1 | 9/2012 | Ishii et al. |
| 2013/0155349 | A1 | 6/2013 | Huang |
| 2016/0183387 | A1 | 6/2016 | Tsunekawa et al. |
| 2017/0006726 | A1 | 1/2017 | Li et al. |
| 2017/0099736 | A1 | 4/2017 | Jung et al. |
| 2018/0157091 | A1 | 6/2018 | Lee et al. |
| 2018/0164498 | A1* | 6/2018 | Kim ................ G02F 1/133308 |
| 2018/0228046 | A1 | 8/2018 | Xu et al. |
| 2019/0353950 | A1* | 11/2019 | Jin .................... G02B 6/0088 |

FOREIGN PATENT DOCUMENTS

| | | | |
|---|---|---|---|
| CN | 201607589 | U | 10/2010 |
| CN | 101968580 | A | 2/2011 |
| CN | 201945773 | U | 8/2011 |
| CN | 202189198 | U | 4/2012 |
| CN | 102487596 | A | 6/2012 |
| CN | 102595845 | A | 7/2012 |
| CN | 102608778 | A | 7/2012 |
| CN | 102662260 | A | 9/2012 |
| CN | 102866519 | A | 1/2013 |
| CN | 103048812 | A | 4/2013 |
| CN | 203287650 | U | 11/2013 |
| CN | 203337944 | U | 12/2013 |
| CN | 203455562 | U | 2/2014 |
| CN | 204392729 | U | 6/2015 |
| CN | 204576014 | U | 8/2015 |
| CN | 105717681 | A | 6/2016 |
| CN | 205281076 | U | 6/2016 |
| CN | 205596492 | U | 9/2016 |
| CN | 205720981 | U | 11/2016 |
| CN | 207232575 | U | 4/2018 |
| CN | 108153015 | A | 6/2018 |
| CN | 209281107 | U | 8/2019 |
| CN | 110618562 | A | 12/2019 |
| CN | 210835522 | U | 6/2020 |
| KR | 20160082860 | A | 7/2016 |
| WO | 2015186758 | A1 | 10/2015 |

OTHER PUBLICATIONS

U.S. Appl. No. 17/265,913, Non-Final Office Action dated Jan. 28, 2022.
U.S. Appl. No. 17/265,913, Notice of Allowance dated May 6, 2022.
PCT/CN2020105147 International Search Report and Written Opinion, dated Dec. 10, 2020.
Chinese First Office Action dated Jun. 15, 2023, relating to CN Patent Application No. 201911056111.3.

* cited by examiner

BACKLIGHT MODULE INCLUDING FIXING MEMBER, DISPLAY MODULE AND ASSEMBLING METHOD THEREOF

CROSS-REFERENCE TO RELATED APPLICATIONS

The present application is a continuation-in-part of U.S. application Ser. No. 17/265,913 which is a U.S. National Stage Application under 35 U.S.C. § 371 of International Patent Application No. PCT/CN2020/105147, filed on Jul. 28, 2020, which claims priority to China Patent Application No. 201911056111.3 filed on Oct. 31, 2019, the disclosures of each of which are incorporated by reference herein in their entirety.

TECHNICAL FIELD

The present disclosure relates to a backlight module, a display module and an assembling method thereof.

BACKGROUND

During the assembling process of a liquid crystal display device in the related art, after the assembling of the liquid crystal panel body on the front side of a module is completed, the module needs to be turned over to fix a screen driving board of a liquid crystal panel on the back of the module. The overturning operation is not only cumbersome and laborious, but also likely to cause damage to the liquid crystal panel during the overturning process. Such problems are particularly prominent in the assembling and production of large-size products such as a television.

SUMMARY

According to one aspect of the embodiments of the present disclosure, a backlight module is provided. The backlight module comprises: a backplane; a fixing member fixedly connected to the backplane; and an insertion clamp comprising a mounting portion fixedly connected to the fixing member, and a clamping portion for clamping to a circuit board inserted between the fixing member and the insertion clamp.

In some embodiments, the fixing member is fixedly connected to a back side of the backplane.

In some embodiments, the backlight module further comprises a frame or a bracket, wherein the frame or the bracket is fixedly connected to the backplane, and the fixing member is fixedly connected to the frame or the bracket.

In some embodiments, the fixing member comprises a first plate portion and a second plate portion located on a back side of the first plate portion.

In some embodiments, the insertion clamp comprises a first insertion clamp for fixing a screen driving board of a liquid crystal panel to a back surface of the first plate portion; and the clamping portion of the first insertion clamp has a clamping slot for clamping to the screen driving board.

In some embodiments, the first insertion clamp further comprises an insertion guide portion located on one side of the clamping portion away from the mounting portion and having a guide slope.

In some embodiments, the insertion clamp further comprises a second insertion clamp for fixing a main board of a display device at a position substantially parallel to the second plate portion, the second insertion clamp being substantially flush with the second plate portion; and the clamping portion of the second insertion clamp comprises a pair of hooks for clamping to the main board, the pair of hooks being arranged oppositely and having opposite clamping directions.

In some embodiments, the fixing member further comprises a connection portion connecting the first plate portion and the second plate portion, the first plate portion, the connection portion and the second plate portion defining a guide rail groove; and the mounting portion of the insertion clamp is assembled in the guide rail groove with a gap and fixedly connected to the second plate portion through a fastener.

In some embodiments, the second plate portion is parallel to a light exiting surface of the backlight module; a plane where the first plate portion is located intersects with a plane where the second plate portion is located; and the guide rail groove has a wedge-shaped cross-section.

In some embodiments, the backlight module further comprises at least one optical function film layer located on a front side of the backplane, and comprising a reflective sheet, wherein the fixing member and the insertion clamp are located between the reflective sheet and the backplane.

In some embodiments, the reflective sheet comprises a flat portion and a folded portion located at a periphery of the flat portion and folded toward a light exiting surface of the backlight module; and the fixing member and the insertion clamp are located between the folded portion of the reflective sheet and the backplane.

In some embodiments, the backlight module further comprises: a light bar located between the reflective sheet and the backplane, wherein a light emitting chip of the light bar passes through a hole of the reflective sheet.

In some embodiments, the second plate portion and the connection portion are connected in a T shape, and the second plate portion has a first notch facing away from the insertion clamp.

In some embodiments, the fixing member is fixedly connected to the bracket which comprises a first side portion, a second side portion, and a third side portion, wherein the first side portion and the second side portion are opposite to each other, and two ends of the third side portion are connected to the first side portion and the second side portion respectively; and the fixing member is arranged on a fourth side opposite to the third side portion, and fixedly connected to the first side portion and the second side portion respectively through fasteners.

In some embodiments, the fixing member further comprises a folded portion connected to the first plate portion and folded toward an end side of the backlight module, wherein the folded portion has a second notch for accommodating a flexible circuit connection board of the liquid crystal panel.

According to another aspect of the embodiments of the present disclosure, provided is a display module, comprising: the backlight module according to any one of the above embodiments; the circuit board; and a liquid crystal panel.

In some embodiments, the circuit board is inserted between the fixing member and the insertion clamp of the backlight module.

In some embodiments, the circuit board comprises at least one of a screen driving board of the liquid crystal panel or a main board of a display device.

According to still another aspect of the embodiments of the present disclosure, provided is a an assembling method of a display module, comprising: assembling a liquid crystal panel on a front side of the backlight module according to any one of the above embodiments; and inserting a circuit board between the fixing member and of the backlight module without turning over the backlight module and the liquid crystal panel.

In some embodiments, the circuit board comprises at least one of a screen driving board of the liquid crystal panel or a main board of a display device.

Other features and advantages of the present disclosure will become apparent from the following detailed description of the embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various embodiments of the present disclosure will now be described in detail with reference to the accompanying drawings. The description of the embodiments is merely illustrative and is in no way intended as a limitation to the present disclosure and its application or use. The present disclosure may be implemented in many different forms, which are not limited to the embodiments described herein. These embodiments are provided to make the present disclosure thorough and complete, and fully convey the scope of the present disclosure to those skilled in the art. It should be noted that, unless otherwise specified, the relative arrangements of the components and steps described in these embodiments should be construed as merely illustrative, rather than as a limitation.

The use of the terms "first", "second" and similar words in the present disclosure do not denote any order, quantity or importance, but are merely used to distinguish between different parts. A word such as "comprise", or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular element is located between the first element and the second element, there may be an intermediate element between the particular element and the first element or the second element, and alternatively, there may be no intermediate element between the particular element and the first element or the second element.

Unless otherwise defined, all terms (comprising technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The embodiments of the present disclosure provide a backlight module, a display module and an assembling method thereof to improve the assembling efficiency and the assembling yield during the production process of a display device.

In the embodiments of the present disclosure, the "back side" of a component (or assembly) refers to one side of the component away from a viewer when the display device is in a conventional state of use. Correspondingly, the "front side" of a component refers to one side of the component proximate to a viewer. For a display device with a screen perpendicular to a horizontal plane or declined to the horizontal plane with a certain inclination angle in a state of use, such as a television or a painting screen, the "ground side" of a component (or assembly) refers to one side thereof more proximate to the ground, and the "sky side" refers to one side thereof further away from the ground that is opposite to the ground side. The "left side" refers to one side thereof more proximate to a viewer's left-hand side, and the "right side" refers to one side more proximate to a viewer's right-hand side. It should be noted that the above "ground side", "sky side", "left side", and "right side" are only the position information when the display device remains in a state of use. For a display device with a plurality of states of use, for example, a display device with two uses comprising a horizontal screen and a vertical screen, when the state of use changes, for example, the state of a horizontal screen is converted to the state of a vertical screen, and the positions of various components may also change accordingly.

Figure 1A:
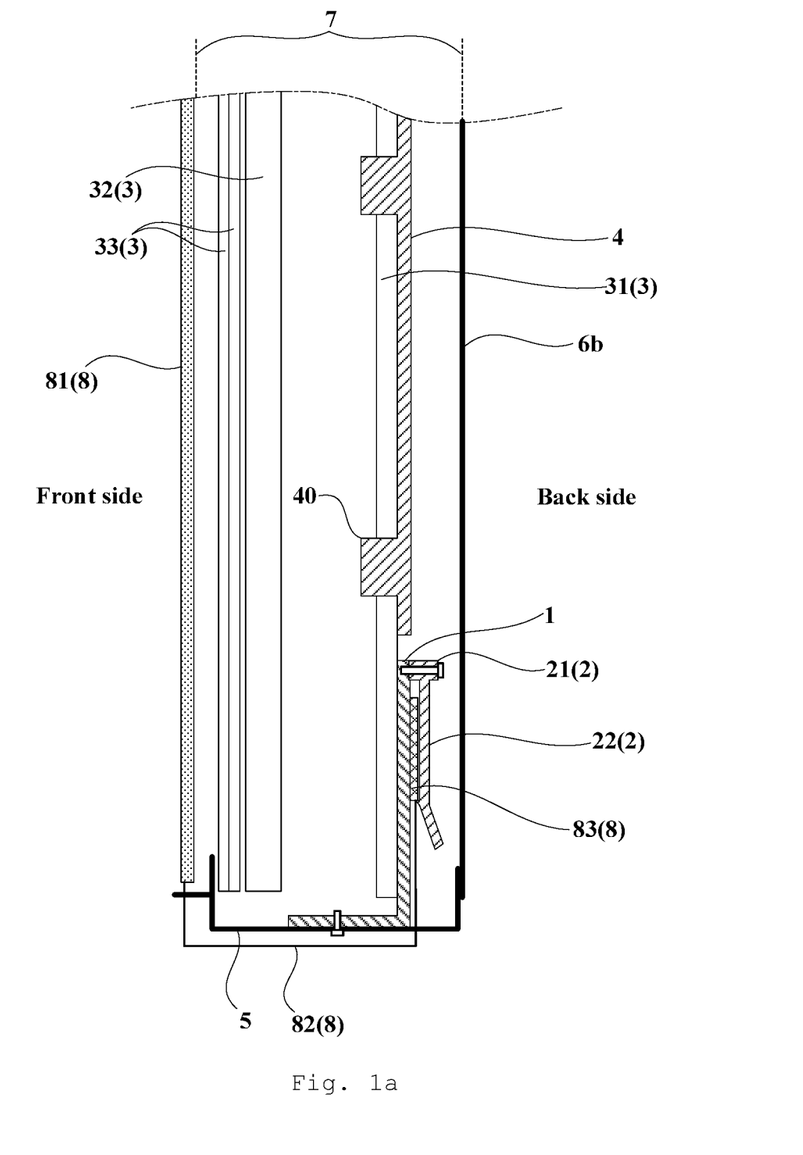
FIG. 1a is a schematic cross-sectional view showing a backlight module of a display module according to some embodiments of the present disclosure.

As shown in FIG. 1a, in some embodiments of the present disclosure, a backlight module 7 is provided. The backlight module 7 comprises a backplane 6b, a fixing member 1 fixedly connected to the backplane 6b, and an insertion clamp 2 comprising a mounting portion 21 and a clamping portion 22. The mounting portion 21 is fixedly connected to the fixing member 1, and the clamping portion 22 is configured to clamp to a circuit board (for example a screen driving board 83 of the liquid crystal panel 8 shown) between the fixing member 1 and the insertion clamp 2.

The backlight module 7 further comprises at least one optical function film layer 3 on a front side of the backplane 6b.

Figure 1B:
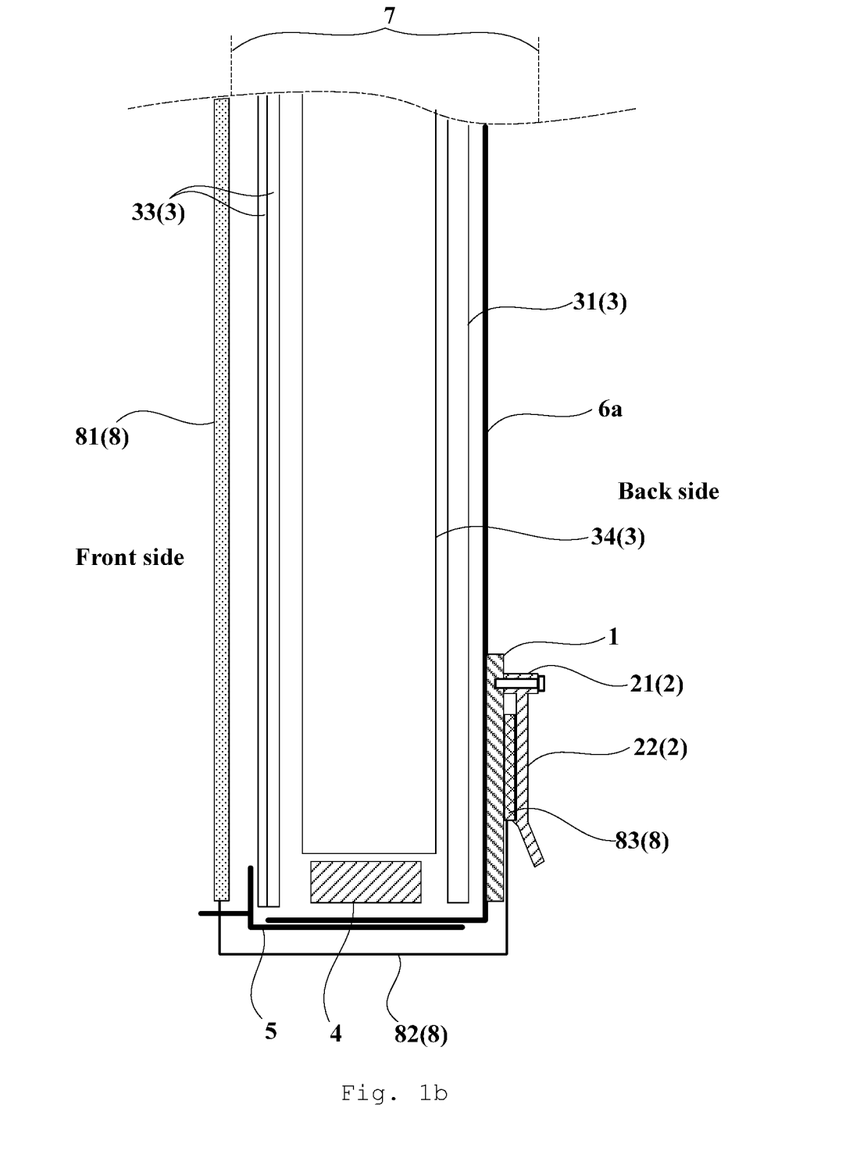
FIG. 1b is a schematic cross-sectional view showing a backlight module of a display module according to other embodiments of the present disclosure.

The liquid crystal panel 8 of a display device comprises a body 81, at least one screen driving board 83, and a flexible circuit connection board 82 connecting the body 81 and the screen driving board 83. The body 81 is a liquid crystal cell structure for screen display. The screen driving board 83 is also referred to as a logic board, and configured to output drive signals to the body 81, such as a data signal, a control signal or a clock signal suitable for a data driver IC and a gate driver IC of the body 81. The flexible circuit connection board 82 is flexible and bendable, and configured to transmit a signal between the screen driving board 83 and the body 81.

The backlight module 7 is not limited to a specific type, and may be, for example a direct type backlight module as shown in FIG. 1a or an edge type backlight module as shown in FIG. 1b.

As shown in FIG. 1a, in some embodiments, the backlight module 7 is a direct type backlight module, and a light bar 4 as a light source is arranged on a back side of the at least one optical function film layer 3. The at least one optical function film layer 3 comprises a reflective sheet 31, a diffusion plate 32 and at least one optical film 33 arranged in sequence from back side to front side. Wherein, the light emitting chip 40 (for example a light emitting diode) of the light bar 4 passes through a hole of the reflective sheet 31. The reflective sheet 31 and the diffusion plate 32 are spaced apart from each other.

As shown in FIG. 1a, some embodiments according to present disclosure provide a backlight module 7 which comprises a backplane 6b, at least one optical function film layer 3 located on a front side of the backplane 6b and a fixing member 1 for fixing a circuit board (for example a screen driving board 83). The at least one optical function film layer 3 comprises a reflective sheet 31, and the fixing member 1 is located between the reflective sheet 31 and the backplane 6b. In some embodiments, the fixing member 1 is fixedly connected to the backplane 6b through an adhesive layer.

As shown in FIG. 1b, in other embodiments, the backlight module 7 is an edge type backlight module. The at least one optical function film layer 3 comprises a reflective sheet 31, a light guide plate 34, and at least one optical film 33. The light bar 4 as a light source is arranged on an end side of the light guide plate 34, and the light emitting chip of the light bar 4 faces an end surface of the light guide plate 34.

In the embodiments shown in FIGS. 1a and 1b of the present disclosure, the backlight module 7 comprises a backplane (the backplane 6b in FIG. 1a and the backplane 6a in FIG. 1b) and a frame 5. The backplane and the frame 5 are fixedly connected to support and limit the optical components to be within the space defined by the backplane and the frame 5. After the liquid crystal panel 8 and the backlight module 7 are assembled, the frame 5 also supports and limits the liquid crystal panel 8. In these embodiments of the present disclosure, the material of the frame 5 may comprise metal or plastic.

In some embodiments of the edge type backlight module or the direct type backlight module of the present disclosure, the fixing member and the insertion clamp are located on the back side of the backplane. For example, as shown in FIG. 1b, the fixing member 1 is fixed to the backplane 6a. In addition, the fixing member may also be fixed to the frame with a folded portion of the fixing member. In some embodiments, in a display device comprising such a backlight module 7, a rear shell (not shown in FIG. 1b) is provided to cover the circuit board and other components.

In some embodiments of the direct type backlight module of the present disclosure, as shown in FIG. 1a, the fixing member 1 and the insertion clamp 2 are located between the reflective sheet 31 and the backplane 6b, and the fixing member 1 is fixed to the frame 5 with a folded portion the fixing member 1. In this case, the backplane 6b of the backlight module 7 may serve as a rear shell of the display device. The backplane 6b may be a flat backplane, for example, a glass backplane which is transparent, opaque, or presents a certain decorative effect. In a display device comprising such a backlight module 7, a rear shell is not needed to be additionally provided, thereby implementing a lower cost, a smaller thickness and a more aesthetic effect of the display device. The display device can be perfectly attached to a wall when being wall-mounted and thus is less likely to have dust accumulated in the back.

In the embodiments of the present disclosure, the circuit board may be a screen driving board 83 of the liquid crystal panel 8 as shown in FIGS. 1a and 1b. In addition, the circuit board may also be a main board or the like of a display device. Taking the display device as a television as an example, the functions of the main board of a television may comprise: processing a key pressing signal, responding to a signal of a remote controller, directly or indirectly controlling backlight, receiving various video signals, converting an image into a low-voltage differential signal and transmitting the low-voltage differential signal to a screen driving board of the liquid crystal panel, or outputting a sound signal to a speaker, and the like.

In the embodiments of the present disclosure, the mounting positions of the fixing member 1 and the insertion clamp 2 may be designed according to the fixing position required by the circuit board, so that the circuit board is inserted between the fixing member 1 and the insertion clamp 2 from an edge of the backlight module. Taking the display device as a liquid crystal television as an example, the fixing member 1 and the insertion clamp 2 may be arranged at positions of an edge of the backlight module 7 proximate to a ground side, which facilitates the insertion of the circuit board from the ground side.

During the assembling process of the liquid crystal display device in the related art, after the assembling of the liquid crystal panel body on the front side of a backlight module is completed, the backlight module needs to be turned over to fix a screen driving board of a liquid crystal panel on the back of the backlight module with a screw. The overturning operation is not only cumbersome and laborious, but also likely to cause damage to the liquid crystal panel during the overturning process. In addition, the main board of the liquid crystal display device in the related art is also fixed on the back of the backlight module with a screw, and similar technical problems are also present.

By using the design in the embodiments of the present disclosure, during the assembling process of a display device, when a circuit board such as a screen driving board of a liquid crystal panel or a main board of the display device is fixed by an assembler, the circuit board is inserted and fixed through an insertion clamp without the overturning of the backlight module, which not only saves time and effort, but also may avoid damage to the backlight module caused by the overturning operation, thereby improving the assembling efficiency and the assembling yield of the display device.

For example, after the body 81 of the liquid crystal panel 8 is assembled on the front side of the backlight module 7, the screen driving board 83 of the liquid crystal panel 8 is directly folded to the back side of the backlight module 7 and inserted between the fixing member 1 and the insertion clamp 2 and fixed through the insertion clamp 2, without the overturning of the backlight module 7. Compared to the related art, not only the assembling operation process is simplified, and the assembling efficiency is improved, but also damage to the liquid crystal panel caused by the overturning operation of the backlight module 7 is avoided, thereby improving the assembling yield.

In the embodiments shown in FIGS. 1a and 1b of the present disclosure, the backlight module 7 comprises a frame 5. As shown in FIG. 1a, the fixing member 1 may be fixed to the frame 5 through a folded portion of the fixing member 1. As shown in FIG. 1b, in these embodiments, the fixing member 1 is fixed to the back surface of the backplane 6a.

Figure 2:
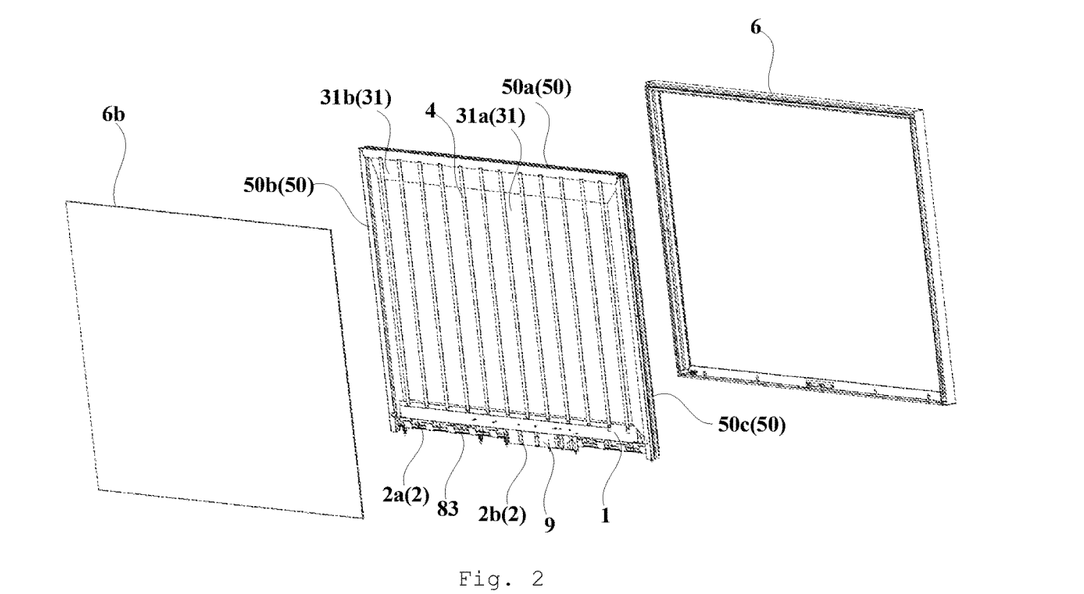
FIG. 2 is an exploded schematic view showing the display module in some embodiments of the present disclosure.
Figure 3:
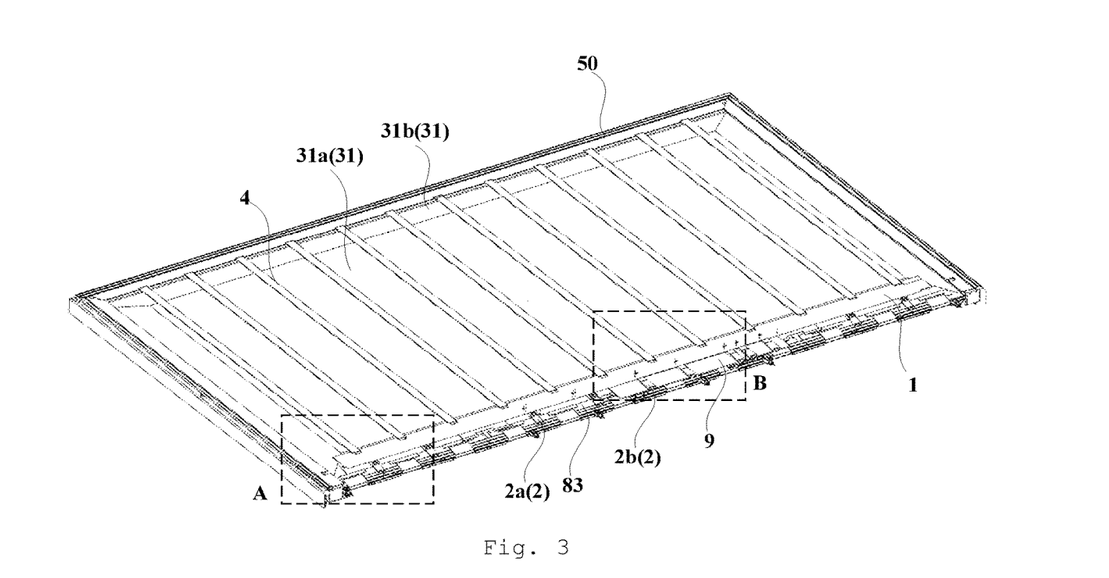
FIG. 3 is a schematic view showing the assembling of a fixing member, an insertion clamp and a circuit board according to some embodiments of the present disclosure.

As shown in FIGS. 2 and 3, other structures of a display device using a direct type backlight module are provided. The backlight module comprises a bracket 50 comprising a first side portion 50b, a second side portion 50c, and a third side portion 50a. The first side portion 50b and the second side portion 50c are opposite to each other, and two ends of the third side portion 50a are connected to the first side portion 50b and the second side portion 50c respectively. The fixing member 1 is arranged on a fourth side opposite to the third side portion 50a, and fixedly connected to the first side portion 50b and the second side portion 50c respectively. For example, the fixing member 1 is in contact with the first side portion 50b and the second side portion 50c respectively. In other words, the fixing member 1 is clamped between the first side portion 50b and the second side portion 50c.

In some embodiments, the fixing member 1 is fixedly connected to the first side portion 50b and the second side portion 50c through fasteners (not shown) respectively. It can be seen that, the fixing member 1, the first side portion 50b, the second side portion 50c, and the third side portion 50a jointly define a frame-shaped structure. For example, the first side portion 50b may be a left side portion, the second side portion 50c may be a right side portion, the third side portion 50a may be a sky side portion, and the fourth side may be a ground side. The structure of the backlight module in these embodiments does not comprise a frame, but the frame-shaped structure formed after the bracket 50 is fixedly connected to the fixing member 1 can function as the aforementioned frame 5. In addition, the exploded view showing the display device shown in FIG. 2 also shows a backplane 6b fixedly connected to the bracket 50 and the fixing member 1, and also shows a front frame 6, for fixing the liquid crystal panel, fixedly connected to the bracket 50 and the fixing member 1.

Figure 4A:
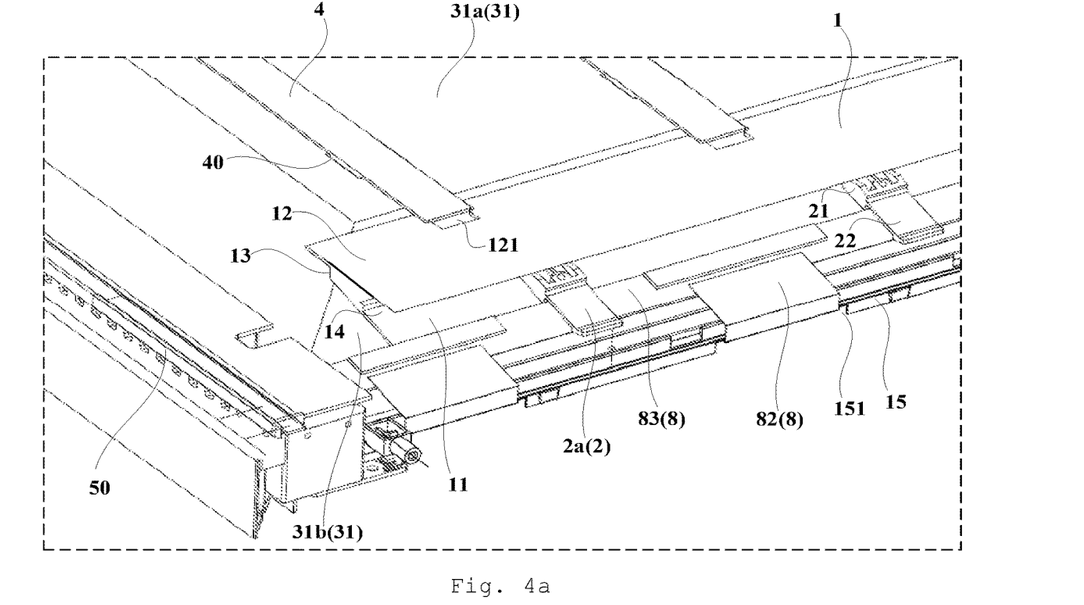
FIG. 4a is an enlarged schematic view at A in FIG. 3.
Figure 4B:
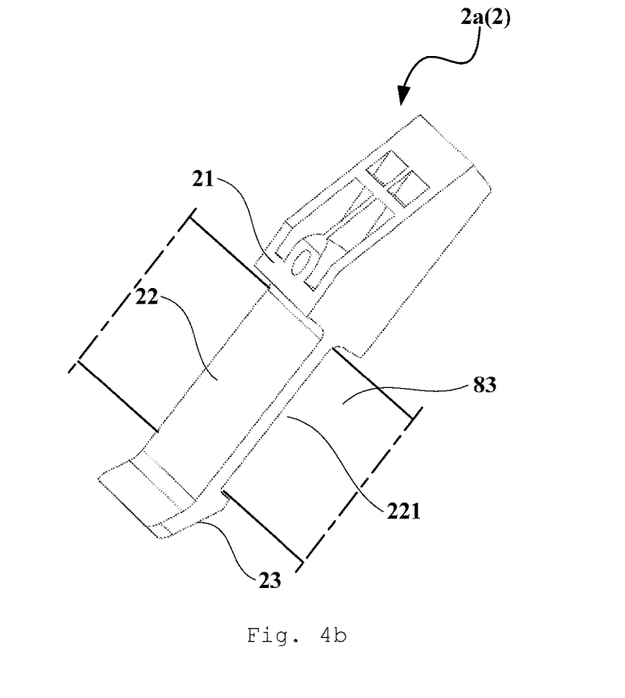
FIG. 4b is a schematic view showing a first insertion clamp in FIG. 3.
Figure 4C:
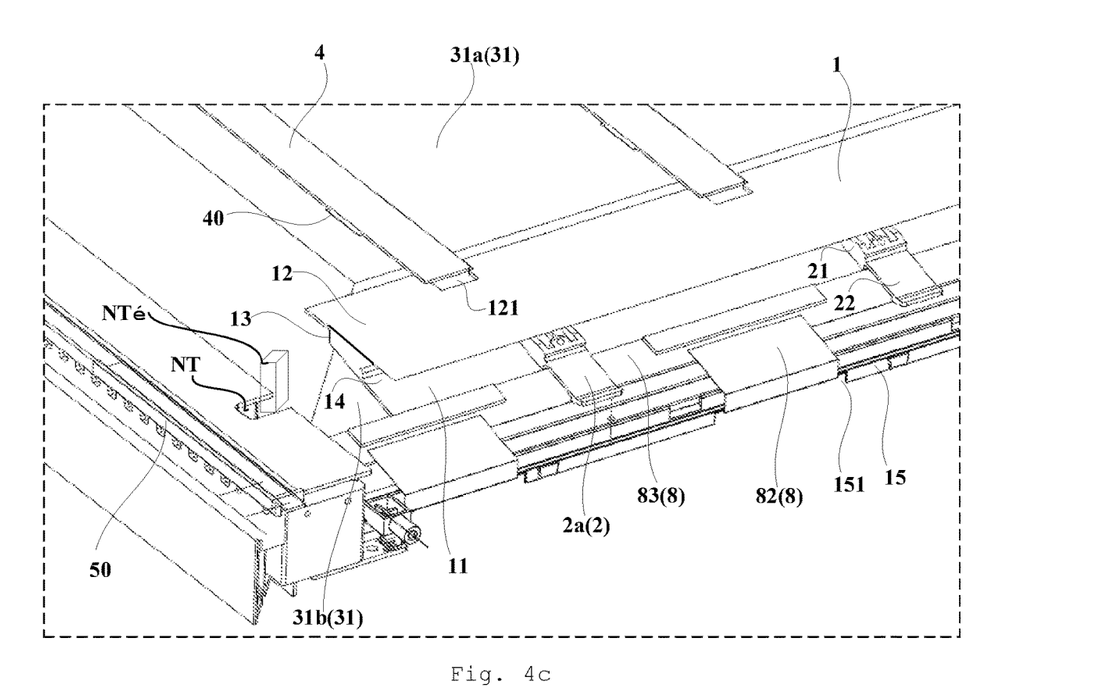
FIG. 4c is a schematic view showing the position relationship between a bracket and a fixing member.

For example, referring to FIG. 4c, the fixing member 1 is fixedly connected to the first side portion 50b through a fastener NT' provided at the notch NT. Similarly, for example, the fixing member 1 is fixedly connected to the second side portion 50c through another fastener provided at another notch of the second side portion 50c.

Figure 4D:
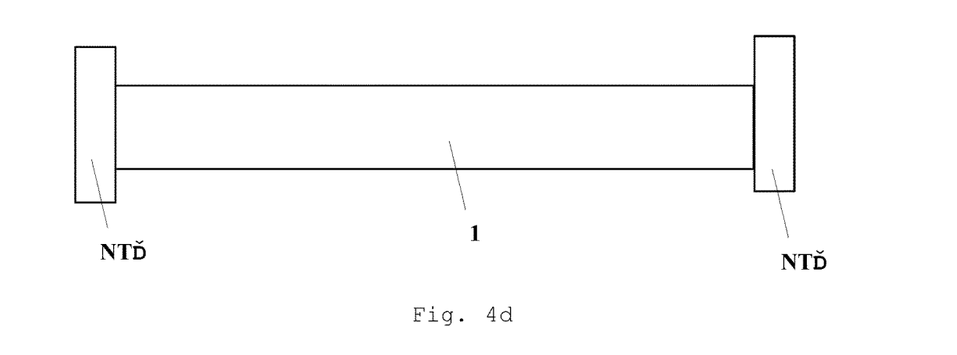
FIG. 4d is a schematic view showing the position relationship between fasteners and a fixing member.

In some embodiments, referring to FIG. 4d, the fixing member 1 is clamped between two fasteners NT'. In other words, the fixing member 1 is in contact with the two fasteners NT'. In some embodiments, the fastener NT' is fixedly connected to the backplane, for example, through an adhesive layer.

In some embodiments, the fastener NT' is wall mountable. For example, the backlight module can be hung by hanging the fastener on a wall which is a support member.

In some embodiments of the present disclosure, as shown in FIGS. 4a, 4b, 5a, and 5b, the fixing member 1 comprises a first plate portion 11, and a space for accommodating a circuit board (for example, the screen driving board 83 or the main board 9) is provided between the first plate portion 11 and the backplane 6b.

In other embodiments of the present disclosure, the fixing member 1 further comprises a second plate portion 12 located on a back side of the first plate portion 11, and the space for accommodating a circuit board is provided between the first plate portion 11 and the second plate portion 12.

In some embodiments, the backlight module 7 further comprises a light bar 4 located between the reflective sheet 31 and the backplane 6b, and the second plate portion 12 has a first notch 121 for positioning the light bar 40. For example, the first notch 121 faces away from the first plate portion 11.

In some embodiments, the second plate portion 12 of the fixing member 1 is parallel to a light exiting surface of the backlight module, and a plane where the first plate portion 11 is located intersects with a plane where the second plate portion 12 is located.

In some embodiments, the fixing member 1 further comprises a connection portion 13 connecting the first board part 11 and the second board part 12, and the first plate portion 11, the connection portion 13 and the second plate portion 12 define a space for accommodating a circuit board.

As shown in FIGS. 4a, 4b, 5a and 5b, in some embodiments of the present disclosure, the fixing member 1 comprises a first plate portion 11 and a second plate portion 12 located on a back side of the first plate portion 11. In addition, the fixing member 1 may further comprise a connection portion 13 connecting the first plate portion 11 and the second plate portion 12. In these embodiments, the first plate portion 11, the connection portion 13 and the second plate portion 12 define a guide rail groove 14. The mounting portion 21 of the insertion clamp 2 is assembled in the guide rail groove 14 with a gap and fixedly connected to the second plate portion 12 through a fastener. The clamping portion 22 is configured to clamp to the circuit board (for example the screen driving board 83 or the main board 9).

The insertion clamp 2 is slidably assembled in the guide rail groove 14 to facilitate the mounting and positioning of the insertion clamp 2. Thus, the accuracy of clamped assembly between the circuit board and the insertion clamp 2 is improved. In addition, the mounting portion 21 of the insertion clamp 2 may also be directly fixed to the second plate portion 12 through a fastener.

The second plate portion 12 may be provided with a plurality of screw holes for fixing the insertion clamp 2 along a length direction of the guide rail groove 14, so that a certain number of insertion clamps 2 may be mounted by selecting some screw holes according to the size and arranging position of the circuit board. This allows that the backlight module can be applied to display devices of a plurality of specifications with a wide range of application.

As shown in FIGS. 4a and 4b, in some embodiments of the present disclosure, the insertion clamp 2 comprises a first insertion clamp 2a in elastic contact with the first plate portion 11, and configured to fix the screen driving board 83 of the liquid crystal panel to the back surface of the first plate portion 11. The clamping portion 22 of the first insertion clamp 2a has a clamping slot 221 for clamping the screen driving board 83. In addition, the first insertion clamp 2a may further comprise an insertion guide portion 23 located on one side of the clamping portion 22 away from the mounting portion 21 and having a guide slope, so as to facilitate the insertion of the screen driving board 83.

Figure 5A:
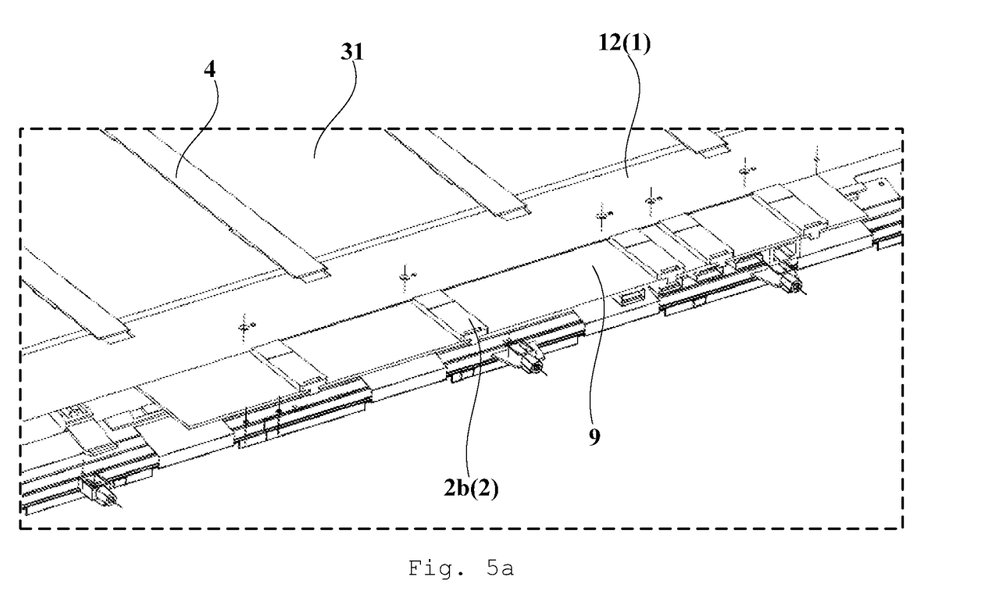
FIG. 5a is an enlarged schematic view at B in FIG. 3.
Figure 5B:
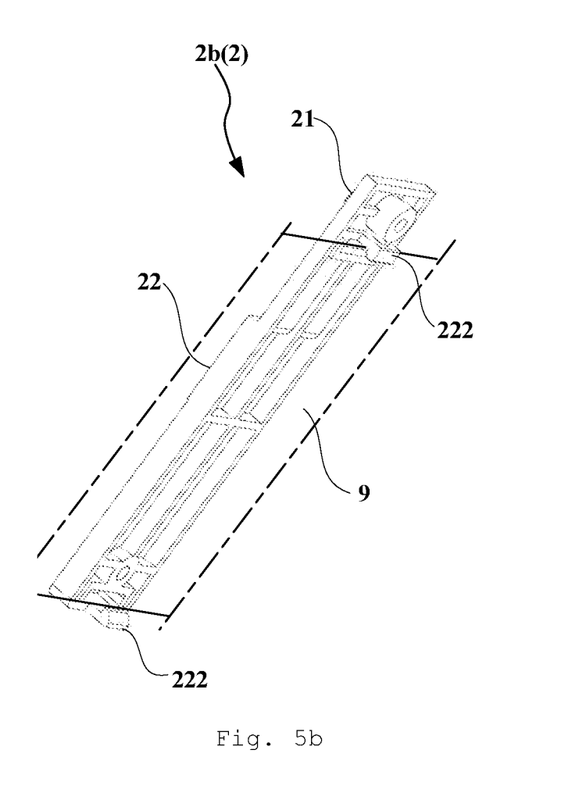
FIG. 5b is a schematic view showing a second insertion clamp in FIG. 3.

In addition, as shown in FIGS. 5a and 5b, in some embodiments, the insertion clamp 2 further comprises a second insertion clamp 2b substantially flush with the second plate portion 12, and configured to fix the main board 9 of the display device at a position substantially parallel to the second plate portion 12. The clamping portion 22 of the second insertion clamp 2b comprises a pair of hooks 222 for clamping the main board 9. The pair of hooks 222 are arranged oppositely and have opposite clamping directions. That is, the screen driving board 83 of the liquid crystal panel and the main board 9 of the display device are fixed on different planes respectively, and the screen driving board 83 is connected to the main board through a flexible circuit board.

It should be noted that in the present disclosure, the term "substantially" is relative to an "absolutely desired" condition. Since the processing and assembling errors as well as the shape details are considered, "substantially" may be understood to be within a certain error range.

By using the design in these embodiments, the space in the back of the direct backlight module may be effectively utilized, and the structure display product is more compact. The screen driving board 83 and the main board 9 are both fixed by way of insertion, the assembling of the display product is convenient, and the assembling efficiency of the display product is significantly improved.

In some embodiments of the present disclosure, the backlight module is a direct type backlight module. The backplane is located on a back side of the reflective sheet, and the fixing member and the insertion clamp are located between the reflective sheet and the backplane. In this way, the screen driving board 83 and the main board 9 may be both fixed between the reflective sheet and the backplane, thus a rear shell for protecting the circuit board in the display device is not needed to be additionally provided, which allows a more aesthetic overall effect of the display device. As shown in FIGS. 3 and 4a, the reflective sheet 31 comprises a flat portion 31a and a folded portion 31b located at a periphery of the flat portion 31a and folded toward a light exiting surface of the backlight module. In some embodiments, the fixing member 1 is located between the folded portion 31b of the reflective sheet 31 and the backplane. In other embodiments, the fixing member 1 and the insertion clamp 2 are located between the folded portion 31b of the reflective sheet 31 and the backplane (not shown). In some embodiments, the second plate portion 12 of the fixing member 1 is parallel to the light exiting surface of the backlight module. The plane where the first plate portion 11 is located intersects with the plane where the second plate portion 12 is located, thus the guide rail groove 14 has a wedge-shaped cross section. It is to be noted that the light exiting surface of the backlight module refers to one surface of the backlight module away from the backplane. In these embodiments, the fixing member 1 may support the reflective sheet 31 and may be in contact with the backplane. The fixing member 1 and the insertion clamp 2 are located between the folded portion 31b of the reflective sheet 31 and the backplane, and the space of a back side of a periphery of the reflective sheet 31 is effectively utilized, which is more favorable for a slim design of the display device.

As shown in FIG. 4a, the second plate portion 12 of the fixing member 1 and the connection portion 13 are connected in a T shape. The second plate portion 12 has a first notch 121 configured to position the light bar 4 and facing away from the insertion clamp 2. The light bar 4 is positioned by utilizing the first notch 121 of the second plate portion 12 of the fixing member 1, which facilitates the assembling of the light bar 4 with a simple structure and is beneficial to reduce the production cost.

As shown in FIG. 4a, in some embodiments, the fixing member further comprises a folded portion 15 connected to the first plate portion 11 and folded toward an end side of the backlight module. Here, the folded portion 15 is folded away from the backplane. In other words, the folded portion 15 is folded toward a display panel. After the fixing member 1 is fixedly connected to the aforementioned bracket, the folded portion 15 may limit the positions of structures such as an optical function film layer and may also support the body of the liquid crystal panel. In addition, in some embodiments, the folded portion 15 has a second notch 151 for accommodating the flexible circuit connection board 82 of the liquid crystal panel. By designing the second notch 151 of the folded portion 15, the flexible circuit connection board 82 is prevented from protruding from the surface of the folded portion 15, thereby effectively reducing damage to the flexible circuit connection board 82 during the assembling process.

In the embodiments of the present disclosure, the numbers of the first insertion clamp 2a and the second insertion clamp 2b are not limited and may be determined according to the number and size of the circuit board. The material of the fixing member may be a metal, and the material of insertion clamp may be plastic material with a favorable elasticity such as polycarbonate.

Referring to FIGS. 1a and 1b, the embodiments of the present disclosure also provide a display module comprising the backlight module 7, a circuit board, and a liquid crystal panel 8 according to any of the foregoing embodiments. For example, the liquid crystal panel 8 is located on a front side of the backlight module 7, and the screen driving board 83 of the liquid crystal panel 8 is folded to a back side of the backlight module 7, inserted between the fixing member 1 and the insertion clamp 2, and fixed through the insertion clamp 2. In addition, the main board or other circuit boards of the display device may also be fixed by similar insertion clamps.

When some circuit boards of the display device is fixed to a backlight module by an assembler, the circuit board is directly inserted and fixed through the insertion clamp 2 without the overturning of the backlight module, which saves time and effort, and avoids damage caused to the backlight module due to the overturn operation, thereby improving the assembling efficiency and the assembling yield of the display device.

The display device is not limited to a specific product type, and may be, for example, a television, a painting screen, a monitor, a tablet computer, or a notebook computer. For a large-screen display device such as a television, the aforementioned beneficial effects are more evident.

Figure 6:
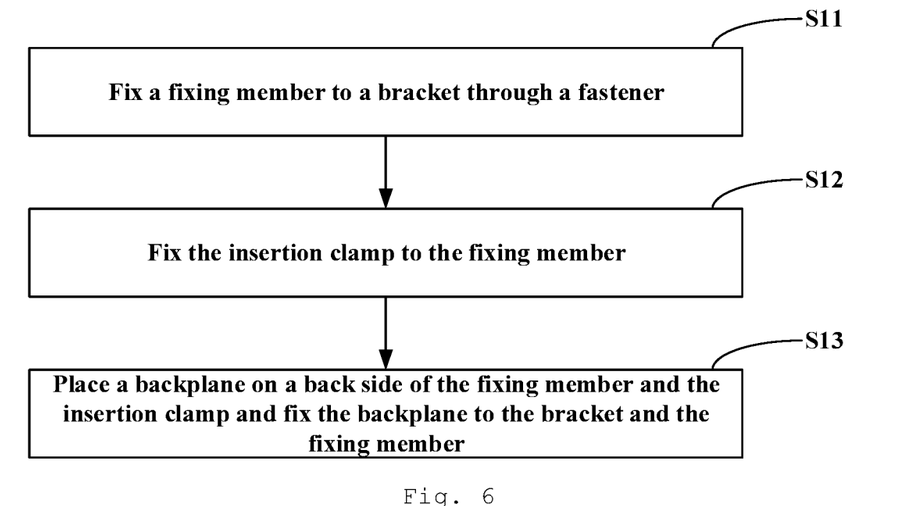
FIG. 6 is a flowchart showing an assembling method of a backlight module according to some embodiments of the present disclosure.

As shown in FIG. 6, in the embodiments of the present disclosure, an assembling method of the aforementioned backlight module is also provided. The assembling method comprises the following steps.

At step S11, a fixing member is fixed to a bracket. The bracket comprises a first side portion 50b, a second side portion 50c, and a third side portion 50a. The first side portion 50b and the second side portion 50c are opposite to each other, and two ends of the third side portion 50a are connected to the first side portion 50b and the second side portion 50c respectively. The fixing member 1 is arranged on a fourth side opposite to the third side portion 50a, and fixedly connected to the first side portion 50b and the second side portion 50c by fasteners (not shown) respectively. It can be seen that the fixing member 1, the first side portion 50b, the second side portion 50c, and the third side portion 50a jointly form a frame-shaped structure. For example, the first side portion 50b may be a left side portion, the second side portion 50c may be a right side portion, the third side portion 50a may be a sky side portion, and the fourth side may be a ground side.

At step S12, the insertion clamp is fixed to the fixing member. The insertion clamp is configured to fix a circuit board inserted between the fixing member and the insertion clamp. For example, a plurality of first insertion clamps and a plurality of second insertion clamps in the foregoing embodiment are fixed to the second plate portion of the fixing member by screws.

At step S13, a backplane is placed on a back side of the fixing member and the insertion clamp and is fixed to the bracket and the fixing member. For example, a glass backplane is adhesively fixed to the bracket and the fixing member through an adhesive layer.

After the step S13 is completed, various optical components may be assembled in sequence on a front side of the backplane. For example, a light bar, a reflective sheet, a diffusion plate, an optical film and the like are assembled in sequence on a front side of the glass backplane.

Figure 7:
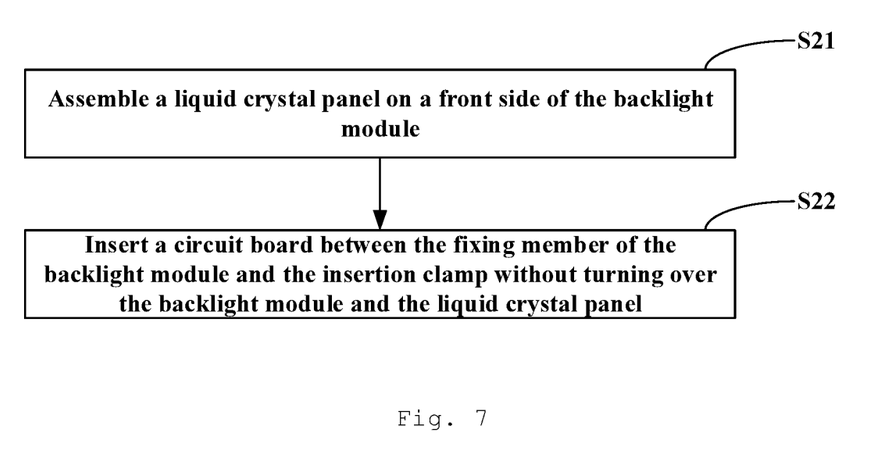
FIG. 7 is a flowchart showing an assembling method of a display module according to some embodiments of the present disclosure.

As shown in FIG. 7, in the embodiments of the present disclosure, an assembling method of a display module is also provided. The assembling method comprises the following steps.

At step S21, a liquid crystal panel is assembled on a front side of the backlight module in the foregoing embodiments.

At step S22, a circuit board is inserted between the fixing member of the backlight module and the insertion clamp without turning over the backlight module and the liquid crystal panel.

In some embodiments, after the step S21, a circuit board is fixed to the fixing member. In some embodiments, the circuit board is inserted to a space between a first plate portion of the fixing member and the backplane. In other embodiments, the circuit board is inserted to a space between the first plate portion of the fixing member and a second plate portion of the fixing member.

Therefore, the circuit board may be fixed to the fixing member through the insertion clamp.

According to some embodiments of the present disclosure, the circuit board may comprise a screen driving board of a liquid crystal panel.

According to some embodiments of the present disclosure, a main board or other circuit boards of the display device may also be fixed by an insertion clamp with a similar structure.

It can be seen that, during the assembling process of the display module, the circuit board is directly inserted and fixed on a back side through an insertion clamp without turning over the backlight module, thereby improving the assembling efficiency and the assembling yield of the display module.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments may be made without departing from the scope and spirit of the present disclosure. The scope of the present disclosure is defined by the appended claims.

What is claimed is:

1. A backlight module, comprising:
    a backplane;
    at least one optical function film layer located on a front side of the backplane and comprising a reflective sheet;
    a fixing member for fixing a circuit board, the fixing member being located between the reflective sheet and the backplane; and
    a frame, wherein the backplane and the frame are fixedly connected to support and limit the at least one optical function film layer to be within a space defined by the backplane and the frame.

2. The backlight module according to claim 1, wherein the fixing member comprises a first plate portion, a space for accommodating the circuit board being provided between the first plate portion and the backplane.

3. The backlight module according to claim 2, wherein the fixing member further comprises a second plate portion located on a back side of the first plate portion, the space for accommodating the circuit board being provided between the first plate portion and the second plate portion.

4. The backlight module according to claim 3, further comprising:
    a light bar located between the reflective sheet and the backplane, wherein the second plate portion has a first notch for positioning the light bar.

5. The backlight module according to claim 4, wherein a light emitting chip of the light bar passes through a hole of the reflective sheet.

6. The backlight module according to claim 3, wherein the second plate portion is parallel to a light exiting surface of the backlight module, and a plane where the first plate portion is located intersects with a plane where the second plate portion is located.

7. The backlight module according to claim 3, wherein the fixing member further comprises a connection portion connecting the first plate portion and the second plate portion, wherein the first plate portion, the connection portion, and the second plate portion define the space for accommodating the circuit board.

8. The backlight module according to claim 2, wherein the fixing member further comprises a folded portion connected to the first plate portion and folded away from the backplane.

9. The backlight module according to claim 8, wherein the folded portion has a second notch for accommodating a flexible circuit connection board of a liquid crystal panel.

10. The backlight module according to claim 1, further comprising:
    a bracket which comprises a first side portion, a second side portion, and a third side portion, wherein the first side portion and the second side portion are opposite to each other, and two ends of the third side portion are connected to the first side portion and the second side portion respectively, wherein the fixing member is arranged on a fourth side opposite to the third side portion, and fixedly connected to the first side portion and the second side portion respectively.

11. The backlight module according to claim 1, wherein:
the reflective sheet comprises a flat portion and a folded portion located at a periphery of the flat portion and folded toward a light exiting surface of the backlight module; and
the fixing member is located between the folded portion of the reflective sheet and the backplane.

12. The backlight module according to claim 1, further comprising:
an insertion clamp comprising a mounting portion fixedly connected to the fixing member, and a clamping portion for clamping to the circuit board inserted between the fixing member and the insertion clamp.

13. The backlight module according to claim 12, wherein:
the insertion clamp comprises a first insertion clamp for fixing a screen driving board of a liquid crystal panel to a back surface of a first plate portion of the fixing member; and
the clamping portion of the first insertion clamp has a clamping slot for clamping to the screen driving board.

14. The backlight module according to claim 13, wherein the first insertion clamp further comprises an insertion guide portion located on one side of the clamping portion away from the mounting portion and having a guide slope.

15. The backlight module according to claim 13, wherein:
the insertion clamp further comprises a second insertion clamp for fixing a main board of a display device at a position substantially parallel to a second plate portion located on a backside of the first plate portion, the second insertion clamp being substantially flush with the second plate portion; and
the clamping portion of the second insertion clamp comprises a pair of hooks for clamping to the main board, the pair of hooks being arranged oppositely.

16. A display module, comprising:
the backlight module according to claim 1;
the circuit board; and
a liquid crystal panel.

17. A backlight module, comprising:
a backplane;
at least one optical function film layer located on a front side of the backplane and comprising a reflective sheet;
a fixing member for fixing a circuit board, the fixing member being located between the reflective sheet and the backplane; and
a bracket which comprises a first side portion, a second side portion, and a third side portion, wherein the first side portion and the second side portion are opposite to each other, and two ends of the third side portion are connected to the first side portion and the second side portion respectively,
wherein the fixing member is arranged on a fourth side opposite to the third side portion, and is fixedly connected to the first side portion and the second side portion respectively through fasteners.

18. The backlight module according to claim 17, the fasteners are wall mountable.

19. An assembling method of a display module, comprising:
assembling a liquid crystal panel on a front side of a backlight module, the backlight module comprising a backplane, at least one optical function film layer located on a front side of the backplane and comprising a reflective sheet, a fixing member and a frame, the fixing member being located between the reflective sheet and the backplane, and the backplane and the frame being fixedly connected to support and limit the at least one optical function film layer to be within a space defined by the backplane and the frame; and
fixing a circuit board to the fixing member without turning over the backlight module and the liquid crystal panel.

* * * * *